Nov. 6, 1951 H. GOLDBERG 2,574,259

TELEVISION INTERMEDIATE FREQUENCY AMPLIFIER

Filed April 14, 1947

Inventor

HAROLD GOLDBERG

By Robert T. Killman

Attorney

Patented Nov. 6, 1951 2,574,259

UNITED STATES PATENT OFFICE 2,574,259

TELEVISION INTERMEDIATE FREQUENCY AMPLIFIER

Harold Goldberg, Towson, Md., assignor to Bendix Aviation Corporation, Towson, Md., a corporation of Delaware Application April 14, 1947, Serial No. 741,293

17 Claims. (Cl. 179—171)

Figure 2:
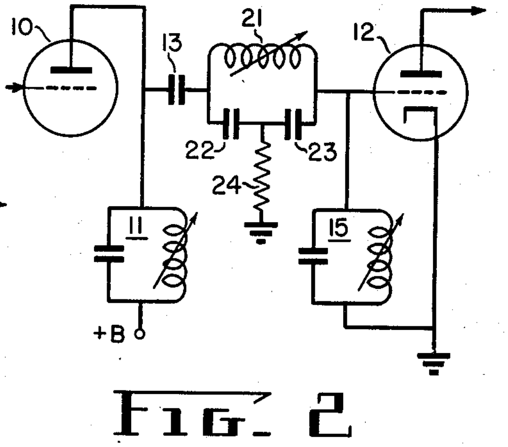

This invention is directed to television receivers. More specifically it is directed to sound rejection and sound separation circuits for television I. F. amplifiers.

Television receivers receiving sound from a sound transmitter which is separate from the picture transmitter, and which is on continuously, receive and demodulate sound and picture information by two generally accepted methods. In one of these, the combined signal is amplified by the R. F. amplifier and converted to the intermediate frequency region where a division between the sound and picture components is made. The other method, often referred to as the "Dome" system puts the composite signal through a single R. F.-I. F. chain and the separation finally is accomplished after the second detector.

Both systems require that the I. F. amplifier discriminate against an adjacent sound channel by at least 20 db. The dual I. F. system requires some means of separating the sound and picture I. F. signals and discriminating against the desired sound channel by at least 40 db. in the picture I. F. amplifier. The "Dome" system requires a plateau in the I. F. transmission characteristic at the desired sound I. F. frequency which is at least 20 db. below the band center, and a rejection of the adjacent channel sound of at least 20 db.

It is very desirable, from the standpoint of I. F. amplifier design, to provide a separation circuit with the following properties:

(1) The desired "hole" in the picture I. F. response is obtained with little effect on the transmission characteristic over the picture I. F. signal range;

(2) Efficient sound separation is obtained with no spurious and undesired responses;

(3) The tuning of the various I. F. circuits may be accomplished with negligible interaction of the tuning controls; and (4) The use of separation circuits does not appreciably impair the efficiency of the picture I. F. channel.

Two types of separation circuits have been popular in the past and are still in use, viz.: the use of a series resonant circuit used as a shunt element for discriminating against sound signals in the picture I. F. channel, and the use of an inductively coupled wave trap. Neither of these is completely satisfactory, especially in connection with stagger-tuned amplifiers. They are particularly objectionable on counts 1 and 3, above. Both circuits, in addition to the desired "hole" in the response, give rise to an additional peak corresponding to an anti-resonant frequency. In both circuits rejection and pass frequency tuning are interrelated and tuning is difficult.

From a utilitarian point of view, particularly in television receivers with their many tuning adjustments, it is imperative that designs be available that may be aligned by using only an AM signal generator. Tuning a staggered system with ten or more adjustments, including traps, with a sweep oscillator is almost impossible. Even "touching up" alignment with a sweep oscillator after an initial CW AM setup is an undesirable procedure unless at the most one or two adjustments is needed.

The object of this invention is to provide a circuit for sound separation and rejection in a television I. F. system wherein the desired "hole" in the picture I. F. response is obtained with little effect on the transmission characteristic over the picture I. F. signal range.

It is a further object of this invention to provide a circuit for sound separation and rejection in a television I. F. system wherein efficient sound separation is obtained with no spurious and undesired responses.

It is a further object of this invention to provide a circuit for sound separation and rejection in a television I. F. system wherein the tuning of the various I. F. circuits may be accomplished with substantially no interaction of the tuning controls.

It is a further object of this invention to provide a circuit for sound separation and rejection in a television I. F. system wherein the use of the separation circuit has no appreciable effect on the transmission of the picture I. F. signal.

These objects are accomplished by the use of three coupling impedances between I. F. stages at the point at which it is desired to separate the sound from the picture signals. The three impedances are preferably three parallel resonant circuits, the first of which is employed in the output circuit of a vacuum tube and is coupled by the serially connected second impedance to the third impedance, which is the selective element in the input circuit of the succeeding vacuum tube. This configuration is conventionally arranged, for the purpose here outlined, so that the first and third impedances are tuned by adjusting them to bring the principal responses to the mean frequency of the pass band or to frequencies within the pass band equably disposed about the mean frequency, while the second impedance is tuned to the frequency to be rejected or separated. When so arranged, the tuning of the three impedances is so interdependent that proper alignment is difficult, and in addition, after the impedances have been adjusted to provide a sharp decrease in transmission upon proceeding from the pass band to the rejection frequency, it will be found that there is a region of relatively free transmission beginning immediately beyond the rejection frequency. It is customary to insert additional elements (known as "wing traps") in succeeding amplifier coupling circuits to attenuate interfering signals occurring in this region of undesired transmission. I have discovered that this undesired transmission and the need for the "wing traps" may be avoided by tuning the first impedance to the frequency of the signal to be rejected or separated by the second impedance. Under these conditions, the first (or source) impedance is substantially resistive in the region of the rejected frequency, the circuit comprising the three impedances viewed as a series arrangement is highly damped so that currents circulating through the circuit are minimized, and as a consequence, interdependence of the tuning adjustments is minimized. Further, tuning two of the impedances to the same frequency removes one resonant and one anti-resonant mode of oscillation from the system of the three impedances as a whole, and places within the pass band all those remaining. In particular, it should be observed that the sign of all three impedances is the same at any frequency outside the pass band and beyond the rejection frequency, so that no resonant mode can occur to cause "wing" responses as with the older arrangement. The rejection may be improved by substitution of a suitable three terminal filter network for the second impedance, and by coupling to the second impedance or its equivalent another similarly tuned circuit, provided only that the coupling is sufficiently loose that the second impedance (or equivalent) does not exhibit double resonance phenomena. The coupled resonant circuit may be used to divert the rejected signal to another channel. I have discovered it to be superior to circuits specifically arranged for such separation, because the signal rejected from the first channel must appear across the second impedance at maximum level to be absorbed and the signal to be transmitted must be at the minimum level to be effectively transmitted.

The above and further objects and novel features will more fully appear from the following detailed description when the same is read in connection with the accompanying drawings. It is to be expressly understood that the drawings are for the purpose of illustration only, and are not intended as a definition of the limits of the invention, reference for this purpose being had to the appended claims.

Figure 1:
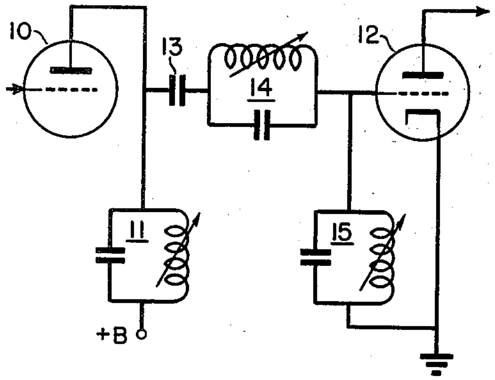
Figure 4:
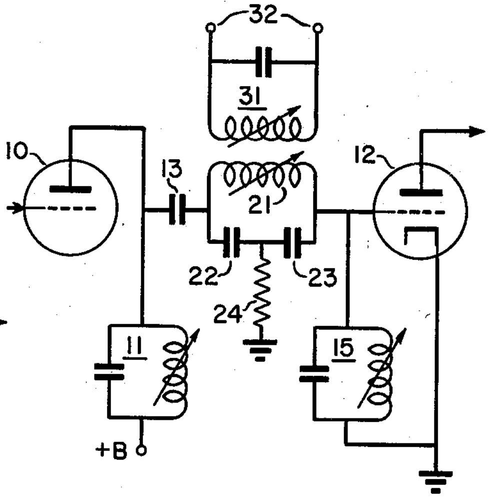
Figure 3:
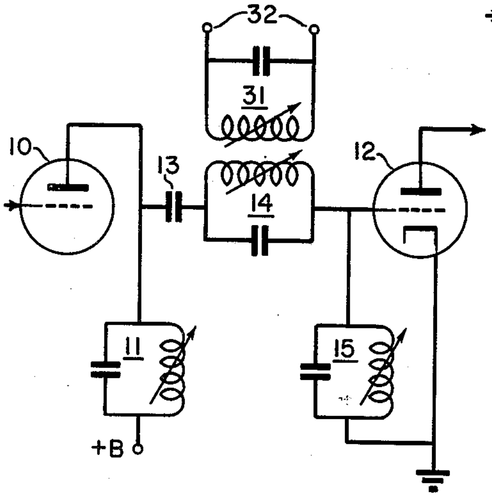

In the drawings, wherein like reference characters refer to like components in the several figures, Fig. 1 is a schematic illustration of a rejection circuit in acordance with the instant invention, Fig. 2 is a preferred embodiment of the Fig. 1 arrangement, Fig. 3 is a schematic illustration of a sound separation and rejection circuit in accordance with the instant invention, and Fig. 4 is a preferred embodiment of the Fig. 3 arrangement.

Referring now to Fig. 1 there is illustrated a vacuum tube 10 having an anode load circuit comprising a parallel resonant circuit 11. The anode of the tube 10 is connected to the control electrode of a tube 12 through a series circuit comprising a blocking condenser 13 and a parallel resonant circuit 14. The control electrode of the tube 12 is connected to ground through a parallel resonant circuit 15.

In operation the tube 10 may be either the first detector or an I. F. stage, and the tube 12 is a portion of the picture I. F. amplifier. The anode circuit (not shown) of the tube 12 is connected to subsequent amplification and/or detection stages and thence to the video amplifiers and/or the picture tube. Assuming that the desired frequency of transmission through the picture I. F. channel is $fp$, and that an undesired sound I. F. frequency $f_s$ is present in the output of the tube 10, it is only necessary to tune the circuits 11 and 14 to the frequency of the undesired sound signal $f_s$ and tune the circuit 15 to the desired transmission frequency $fp$ and a rejection of up to 20 db. of the sound signal will be attained. This rejection is due to the circuit 14 which presents an extremely high impedance to the frequency $f_s$.

In the Fig. 2 arrangement a bridged-T network comprising an inductor 21, a pair of condensers 22 and 23 of equal capacity, and a resistor 24 replaces the simple parallel resonant circuit 14 of the Fig. 1 arrangement. The proper adjustment of this circuit, which may provide well over 40 db. of rejection, when R = the resistance of the resister 24

Q = the $Q\left(\frac{\omega L}{R}\right)$ of the inductor 21

C = twice the capacity of condenser 22

$f_s$ = the frequency of the undesired sound I. F.

$$\sqrt{LC} = (2\pi f_s)^{-1}$$
$$R = Q[8\pi f_s C]^{-1} \qquad (1)$$

the impedance of the bridged-T network at $f_s$ is then 4R.

Under these circumstances the bridge-T network is a true "null" network.

In this arrangement the circuit 11 is tuned to the frequency $f_s$, and the circuit 15 is tuned to the frequency $f_p$, as in the Fig. 1 arrangement.

The foregoing circuits are rejection circuits for eliminating the sound I. F. signal from the picture I. F. channel. If, however, it is desired to separate the sound signal at this point it is only necessary to inductively couple an additional resonant circuit, tuned to the frequency ($f_s$) of the sound channel to the inductor portion of the resonant circuit 14 of the Fig. 1 arrangement or to the inductor 21 of the Fig. 2 arrangement. These are shown, respectively in Figs. 3 and 4 wherein the circuit 31 is coupled, with less than critical coupling, to the above mentioned circuits. A pair of output terminals 32 in each case provides a point from which a sound I. F. signal ($f_s$) may be obtained.

In the Fig. 4 arrangement, with the bridged-T circuit adjusted to a true "null" at the sound I. F. frequency the sound coupling circuit 31 is a simple double-tuned I. F. transformer secondary at the sound frequency ($f_s$).

What is claimed is:

1. A transmission and rejection network for an amplifier comprising: a first vacuum tube having at least an anode; a second vacuum tube having at least a control electrode and a cathode; a source of positive potential; a first parallel resonant circuit connected between the said anode and the said source, and being resonant at the rejection frequency; a second parallel resonant circuit serially connected between the said anode and the said control electrode, and being resonant at the rejection frequency; and a third parallel resonant circuit connected between the said control electrode and the said cathode and being resonant at a frequency such that the principal responses of the network lie within a band of frequencies which it is desired to transmit.

2. A transmission and rejection network having a pair of input terminals and a pair of output terminals comprising a parallel resonant circuit across said input terminals resonant at the rejection frequency; a parallel resonant circuit across said output terminals resonant at a frequency such that the principal responses of the network lie within a band of frequencies which it is desired to transmit; and a parallel resonant circuit connected between an input terminal and an output terminal and being resonant at the said rejection frequency.

3. A transmission, separation, and rejection network having a pair of input terminals to which a composite signal of frequencies $f_s$ and $fp$ are applied, a first pair of output terminals for the signal of frequency $f_s$ and a second pair of output terminals for the signal of frequency $fp$, and a rejection circuit which effectively eliminates signals of frequency $f_s$ which otherwise would appear at the output terminals intended for the signal of frequency $fp$ comprising: a tuned circuit across the input terminals resonant to the frequency $f_s$; a second tuned circuit across the first pair of output terminals tuned to the frequency $f_s$; a third tuned circuit across the second pair of output terminals so tuned as to cause the principal responses of the network to be at the frequency $fp$; a fourth tuned circuit resonant at the frequency $f_s$ connected between one of the input terminals and one of said second pair of output terminals; and inductive coupling between said second tuned circuit and said fourth tuned circuit.

4. A transmission and rejection network for an amplifier comprising: a first vacuum tube having at least an anode; a second vacuum tube having at least a control electrode and a cathode; a source of positive potential; a first parallel resonant circuit connected between the said anode and the said source, and being resonant at the rejection frequency; a bridged-T network having a null connected between the said anode and the said control electrode, said null being at the rejection frequency; and a parallel resonant circuit connected between the said control electrode and the said cathode and being resonant at a frequency such that the principal responses of the network lie within a band of frequencies which it is desired to transmit.

5. A transmission and rejection network having a pair of input terminals and a pair of output terminals comprising a parallel resonant circuit across said input terminals resonant at the rejection frequency; a parallel resonant circuit across said output terminals resonant at a frequency such that the principal responses of the network lie within a band of frequencies which it is desired to transmit; and a bridged-T network having substantially zero transmission at a definite frequency, said network being connected between an input terminal and an output terminal, and having substantially zero transmission at the said rejection frequency.

6. A transmission, separation, and rejection network having a pair of input terminals to which a composite signal of frequencies $f_s$ and $fp$ are applied, a first pair of output terminals for the signal of frequency $f_s$ and a second pair of output terminals for the signal of frequency $fp$, and a rejection circuit which effectively eliminates signals of frequency $f_s$ which otherwise would appear at the output terminals intended for the signal of frequency $fp$ comprising: a tuned circuit across the input terminals resonant to the frequency $f_s$; a second tuned circuit across the first pair of output terminals tuned to the frequency $f_s$; a third tuned circuit across the second pair of output terminals so tuned as to cause the principal responses of the network to be at the frequency $fp$; a bridged-T network having substantially zero transmission at the frequency $f_s$, said network including an inductor, connected between the input terminals and one of said second pair of output terminals; and inductive coupling between said second tuned circuit and said inductor.

7. A transmission, separation, and rejection network having a pair of input terminals to which a composite signal of frequencies $f_s$ and $fp$ are applied, a first pair of output terminals for the signal of frequency $f_s$ and a second pair of output terminals for the signal of frequency $fp$, and a rejection circuit which effectively eliminates signals of frequency $f_s$ which otherwise would appear at the output terminals intended for the signal of frequency $fp$ comprising: a tuned circuit across the input terminals resonant to the frequency $f_s$; a second tuned circuit across the first pair of output terminals tuned to the frequency $f_s$; a third tuned circuit across the second pair of output terminals so tuned as to cause the principal responses of the network to be at the frequency $fp$; a fourth tuned circuit resonant at the frequency $f_s$ connected between one of the input terminals and one of said second pair of output terminals; and coupling between said second tuned circuit and said fourth tuned circuit.

8. A transmission, separation, and rejection network having a pair of input terminals to which a composite signal of frequencies $f_s$ and $fp$ are applied, a first pair of output terminals for the signal of frequency $f_s$ and a second pair of output terminals for the signal of frequency $fp$, and a rejection circuit which effectively eliminates signals of frequency $f_s$ which otherwise would appear at the output terminals intended for the signal of frequency $fp$ comprising: a tuned circuit across the input terminals resonant to the frequency $f_s$; a second tuned circuit across the first pair of output terminals tuned to the frequency $fs$; a third tuned circuit across the second pair of output terminals so tuned as to cause the principal responses of the network to be at the frequency $fp$; a bridge-T network having substantially zero transmission at the frequency $f_s$, said network including an inductor, connected between the input terminals and one of said second pair of output terminals; and coupling between said second tuned circuit and said inductor.

9. A transmission, separation and rejection network for an amplifier comprising: a first vacuum tube having at least an anode; a second vacuum tube having at least a control electrode and a cathode; a source of positive potential; a first parallel resonant circuit connected between the said anode and the said source, and being resonant at the rejection frequency; a second parallel resonant circuit connected between said anode and said control electrode, and being resonant at said rejection frequency; a third parallel resonant circuit connected between said control electrode and said cathode and being resonant at a frequency such that the principal responses of the network lie within a band of frequencies which it is desired to transmit; and means for separating from said network energy having the rejection frequency, said separating means comprising a circuit resonant at said rejection frequency and coupled to said second parallel resonant circuit with less than critical coupling.

10. A transmission, separation and rejection network for an amplifier comprising: a first vacuum tube having at least an anode; a second vacuum tube having at least a control electrode and a cathode; a source of positive potential; a first parallel resonant circuit connected between said anode and said source and being tuned to said rejection frequency; a parallel resonant circuit connected between said control electrode and said cathode and being resonant at a frequency such that the principal responses of said network lie within a band of frequencies which it is desired to transmit; a bridged-T circuit having substantially zero transmission at said rejection frequency and being connected between said anode and said control electrode; and means for separating from said network energy having said rejection frequency, said means comprising a circuit resonant at the rejection frequency and coupled to said bridged-T circuit at less than critical coupling.

11. A transmission and rejection network having a pair of input terminals and a pair of output terminals and comprising: a parallel resonant circuit across said input terminals; a parallel resonant circuit across said output terminals; and a parallel resonant circuit connected between an input terminal and an output terminal; two of said circuits, including the last named circuit, being resonant at the rejection frequency and the remaining circuit being resonant at a frequency such that the principal responses of said network lie within a band of frequencies which it is desired to transmit.

12. A transmission and rejection network as set forth in claim 11 having coupled to said last named resonant circuit with less than critical coupling a resonant circuit tuned to said rejection frequency, for the purpose of separating from said network energy having said rejection frequency.

13. A transmission and rejection network having a pair of input terminals and a pair of output terminals and comprising: a parallel resonant circuit across said input terminals; a parallel resonant circuit across said output terminals and a bridged-T network having substantially zero transmission at the rejection frequency and being connected between an input terminal and an output terminal; one of said parallel resonant circuits being resonant at said rejection frequency and the other being resonant at a frequency such that the major responses of said transmission network lie within a band of frequencies desired to be transmitted.

14. A transmission and rejection network as claimed in claim 13 having coupled to said bridged-T network with less than critical coupling a resonant circuit tuned to said rejection frequency, for the purpose of separating from said transmission and rejection network energy having said rejection frequency.

15. A transmission and rejection network for an amplifier comprising: a first vacuum tube having at least an anode; a second vacuum tube having at least a control electrode and a cathode; a source of positive potential; a parallel resonant circuit connected between the said anode and the said source, and being resonant at the rejection frequency; a coupling circuit having parallel resonant elements serially connected between the said anode and the said control electrode, and being resonant at the rejection frequency; and a parallel resonant circuit connected between the said control electrode and the said cathode and being resonant at a frequency such that the principal responses of the network lie within a band of frequencies which it is desired to transmit.

16. A transmission and rejection network having a pair of input terminals and a pair of output terminals comprising a parallel resonant circuit across said input terminals resonant at the rejection frequency; a parallel resonant circuit across said output terminals resonant at a frequency such that the principal responses of the network lie within a band of frequencies which it is desired to transmit; and a coupling circuit having parallel resonant elements connected between an input terminal and an output terminal of said network and being resonant at the said rejection frequency.

17. A transmission, separation, and rejection network comprising a transmission and rejection network as set forth in claim 16 and a circuit resonant at said rejection frequency coupled to said coupling circuit with less than critical coupling.

HAROLD GOLDBERG.

REFERENCES CITED

The following references are of record in the file of this patent:

UNITED STATES PATENTS

| Number | Name | Date |
|---|---|---|
| 2,217,839 | Grundmann | Oct. 15, 1941 |
| 2,356,308 | Fredenhall | Sept. 22, 1944 |